United States Patent
Uchino et al.

(10) Patent No.: US 9,936,471 B2
(45) Date of Patent: Apr. 3, 2018

(54) MOBILE STATION FOR PERFORMING COMPONENT CARRIER-TO-TIMING ADVANCE GROUP MAPPING

(71) Applicant: NTT DOCOMO, INC., Chiyoda-ku (JP)

(72) Inventors: Tooru Uchino, Tokyo (JP); Hideaki Takahashi, Tokyo (JP); Yuta Sagae, Tokyo (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 14/438,100

(22) PCT Filed: Sep. 26, 2013

(86) PCT No.: PCT/JP2013/076044
§ 371 (c)(1),
(2) Date: Apr. 23, 2015

(87) PCT Pub. No.: WO2014/069128
PCT Pub. Date: May 8, 2014

(65) Prior Publication Data
US 2015/0289218 A1    Oct. 8, 2015

(30) Foreign Application Priority Data
Nov. 2, 2012  (JP) .................................. 2012-243123

(51) Int. Cl.
*H04W 56/00* (2009.01)
*H04W 8/24* (2009.01)
(Continued)

(52) U.S. Cl.
CPC ........... *H04W 56/004* (2013.01); *H04L 5/001* (2013.01); *H04W 8/24* (2013.01);
(Continued)

(58) Field of Classification Search
CPC ..... H04W 8/22; H04W 8/24; H04W 56/0005; H04W 56/004; H04W 56/0045
See application file for complete search history.

(56) References Cited

U.S. PATENT DOCUMENTS

2013/0188582 A1* 7/2013 Dinan ................. H04W 52/281
                                                                370/329
2014/0219170 A1* 8/2014 Zhao ....................... H04W 8/24
                                                                370/328

OTHER PUBLICATIONS

International Search Report dated Dec. 10, 2013 in PCT/JP2013/076044 Filed Sep. 26, 2013.
(Continued)

*Primary Examiner* — Pao Sinkantarakorn
(74) *Attorney, Agent, or Firm* — Oblon, McClelland, Maier & Neustadt, L.L.P.

(57) ABSTRACT

Appropriate CC-to-TAG mapping is configured when "UL CA" is performed. A mobile station UE of the invention includes: a management unit 11 configured to manage one or more TAGS; an adjustment unit 12 configured to make adjustment to synchronize transmission timings of uplink signals within CCs which belong to the same TAG; and a transmission unit 13 configured to notify a radio base station eNB of a combination of supported bands, supported CCs, and settable TAGS, and the bands and the CCs grouped in the TAGs included in the combination.

6 Claims, 8 Drawing Sheets

(51) Int. Cl.
    H04L 5/00      (2006.01)
    H04W 76/02     (2009.01)
    H04W 84/04     (2009.01)
(52) U.S. Cl.
    CPC ..... *H04W 56/0045* (2013.01); *H04W 76/025* (2013.01); *H04W 84/042* (2013.01)

(56) References Cited

OTHER PUBLICATIONS

"Draft LS for Multiple TA groups", 3GPP TSG-RAN WG4 Meeting #64bis, R4-126059, Oct. 2012, 2 Pages.
"TAG related signalling", TSG-RAN WG2#78, R2-1212738, May 2012, pp. 1-8.
"Evolved Universal Terrestrial Radio Access (E-UTRA)", Radio Resource Control (RRC), Protocol specification (Release 11), 3GPP TS 36.331 V11.1.0, Sep. 2012, pp. 1-325.
"Updates of Carrier Aggregation agreements (WI R2-111115)", 3GPP TSG-WG2 Meeting #76, R2-116503, Nov. 2011, 4 Pages.
Japanese Office Action dated Nov. 22, 2016 in Patent Application No. 2012-243123 (with English translation).
"Discussion for Multiple TA Groups" NTT DOCOMO, TSG-RAN Working Group 4 Meeting #64, R4-125543, 2012, 4 Pages.
Office Action dated May 9, 2017 in Japanese Patent Application No. 2012-243123 (with computer generated English translation).
"Consideration on Multi-TA Capability", CATT, 3GPP TSG RAN WG2 Meeting #77bis, Bratislava, Slovakia, Oct. 8-12, 2012, R2-124764, pp. 2-4.
"Introduction of Rel-11 UE capabilities", NTT DOCOMO, Inc., 3GPP TSG-RAN WG2 Meeting #79, Qingdao, China, Aug. 13-17, 2012, R2-124314, pp. 2-12.
"RAN2 CRs regarding UE capabilities for multiple REL-11 features", TSG RAN WG2, 3GPP TSG-RAN Meeting #57, Chicago, USA, Sep. 4-7, 2012, RP-121373, pp. 2-17.
"Introduction of Rel-11 UE capabilities", NTT DOCOMO, Inc., 3GPP TSG-RAN WG2 Meeting #79bis, Bratislava, Slovakia, Oct. 8-12, 2012, R2-124796, pp. 2-13.
Office Action dated Nov. 17, 2017 in counterpart Chinese Patent Application No. 201380057354.3 (with English Translation) 12 pages.

* cited by examiner

FIG. 3

*UE-EUTRA-Capability* information element

```
-- ASN1START

<<skip>>

UE-EUTRA-Capability-v1060-IEs ::=    SEQUENCE {
    fdd-Add-UE-EUTRA-Capabilities-v1060   UE-EUTRA-CapabilityAddXDD-Mode-v1060   OPTIONAL,
    tdd-Add-UE-EUTRA-Capabilities-v1060   UE-EUTRA-CapabilityAddXDD-Mode-v1060   OPTIONAL,
    rf-Parameters-v1060                   RF-Parameters-v1060                    OPTIONAL,
    nonCriticalExtension                  UE-EUTRA-Capability-v11xy-IEs          OPTIONAL
}

UE-EUTRA-Capability-v11xy-IEs ::=    SEQUENCE {
    rf-Parameters-v11xy                   RF-Parameters-v11xy                    OPTIONAL,
    nonCriticalExtension                  SEQUENCE {}                            OPTIONAL
}
<<skip>>
RF-Parameters-v11xy ::=              SEQUENCE {
    supportedBandCombinationExt-v11xy     SupportedBandCombinationExt-v11xy
}
<<skip>>
SupportedBandCombinationExt-v11xy ::= SEQUENCE (SIZE (1..maxBandComb-r10)) OF
BandCombinationParametersExt-v11xy
<<skip>>
BandCombinationParametersExt-v11xy ::= SEQUENCE {
    suppportedTAGComb-r11                 SupportedTAGComb-r11                   OPTIONAL
}
<<skip>>
CA-BandwidthClass-r10 ::= ENUMERATED {a, b, c, d, e, f, ...}
<<skip>>
SupportedTAGComb-r11 ::= SEQUENCE (SIZE (1..maxTAGComb-r11)) OF SupportedTAgroups-r11

SupportedTAgroups-r11 ::= SEQUENCE (SIZE (1..maxTAG-r11)) OF TAgroupedBand-r11

TAgroupedBand-r11 ::= SEQUENCE (SIZE (1..maxServCell-r10)) OF TAG-BandParameters-r11

TAG-BandParameters-r11 ::= SEQUENCE {
    bandEUTRA-r11                         INTEGER (1..64),
    ca-BandwidthClassUL-r11               CA-BandwidthClass-r10
}
```

```
maxBandComb-r10      INTEGER ::= 128   -- Maximum number of band combinations.
<<skip>>
maxServCell-r10      INTEGER ::= 5     -- Maximum number of Serving cells
<<skip>>
maxTAG-r11           INTEGER ::= 5     -- Maximum number of TAGs
maxTAGComb-r11       INTEGER ::= 64    -- Maximum number of supported TAG combinations
```

Fig. Proposed capability structure for Alt1

FIG. 5

UE-EUTRA-Capability information element

```
-- ASN1START

<<skip>>

UE-EUTRA-Capability-v1060-IEs ::=    SEQUENCE {
    fdd-Add-UE-EUTRA-Capabilities-v1060  UE-EUTRA-CapabilityAddXDD-Mode-v1060    OPTIONAL,
    tdd-Add-UE-EUTRA-Capabilities-v1060  UE-EUTRA-CapabilityAddXDD-Mode-v1060    OPTIONAL,
    rf-Parameters-v1060                  RF-Parameters-v1060                     OPTIONAL,
    nonCriticalExtension                 UE-EUTRA-Capability-v11xy-IEs
    OPTIONAL
}

<<skip>>

UE-EUTRA-Capability-v11xy-IEs ::=    SEQUENCE {
    rf-Parameters-v11xy                  RF-Parameters-v11xy                     OPTIONAL,
    nonCriticalExtension                 SEQUENCE {}                             OPTIONAL
}

<<skip>>

RF-Parameters-v11xy ::=            SEQUENCE {
    supportedBandCombinationExt-r11      SupportedBandCombinationExt-r11
}

SupportedBandCombination-r10 ::= SEQUENCE (SIZE (1..maxBandComb-r10)) OF BandCombinationParameters-r10

SupportedBandCombinationExt-r10 ::= SEQUENCE (SIZE (1..maxBandComb-r10)) OF
BandCombinationParametersExt-r10

SupportedBandCombinationExt-r11 ::= SEQUENCE (SIZE (1..maxBandComb-r10)) OF
BandCombinationParametersExt-r11

BandCombinationParameters-r10 ::= SEQUENCE (SIZE (1..maxSimultaneousBands-r10)) OF BandParameters-r10

BandCombinationParametersExt-r10 ::= SEQUENCE {
    supportedBandwidthCombinationSet-r10    SupportedBandwidthCombinationSet-r10    OPTIONAL
}

SupportedBandwidthCombinationSet-r10 ::=   BIT STRING (SIZE (1..maxBandwidthCombSet-r10))

BandCombinationParametersExt-r11 ::= SEQUENCE {
    supportedMultipleTA-CapabilitySet-r11  SupportedMultipleTA-CapabilitySet-r11   OPTIONAL
}

SupportedMultipleTA-CapabilitySet-r11 ::=  BIT STRING (SIZE (1..maxMultipleTACapSet-r11))

<<skip>>

-- ASN1STOP
```

FIG. 6

| UE-EUTRA-Capability field descriptions | FDD/ TDD diff |
|---|---|
| .... | |
| supportedBandwidthCombinationSet<br>Field encoded as a bit map, where bit N is set to "1" if UE support Bandwidth Combination Set N for this band combination, see 36.133 [42]. The leading / leftmost bit (bit 0) corresponds to the Bandwidth Combination Set 0, the next bit corresponds to the Bandwidth Combination Set 1 and so on. The UE shall neither include the field for a non-CA band combination, nor for a CA band combination for which the UE only supports Bandwidth Combination Set 0. | - |
| SupportedMultipleTA-CapabilitySet<br>Field encoded as a bit map, where bit N is set to "1" if UE supports Multiple-TA for this TAG configuration N, see 36.xxx [Y]. The leading / leftmost bit (bit 0) corresponds to the capability of Multiple-TA for the Band Combination / Band 0, the next bit corresponds to the capability of Multiple-TA for the Band Combination / Band 1 and so on. The UE shall neither include the field for a non-CA band combination, nor for a CA band combination for which the UE only supports DL CA. | - |
| tm9-With-8Tx-FDD | No |
| twoAntennaPortsForPUCCH | No |

FIG. 7

Table X.Y.1-1: E-UTRA capability of Multiple-TA for CA configurations

| CA Configuration | Combination of Bands configured for UL CA | Component Band configured for UL CA | TAG#W | TAG#X | TAG#Y | TAG#Z | Multiple-TA capabilityset |
|---|---|---|---|---|---|---|---|
| CA_1A-5A | 1A – 5A | 1A | Yes | | | | 0 |
| | | 5A | | Yes | | | |
| CA_1A-19A | 1A-19A | 1A | Yes | | | | 0 |
| | | 19A | | Yes | | | |
| | ..... | | | | | | |
| CA_XA-YA-ZA | XA-YA | XA | Yes | | | | 0 |
| | | YA | | Yes | | | |
| | YA-ZA | YA | Yes | | | | 1 |
| | | ZA | | Yes | | | |
| | XA-YA-ZA | XA | Yes | | | | 2 |
| | | YA | | Yes | | | |
| | | ZA | | | Yes | | |
| | | XA | Yes | | | | 3 |
| | | YA | Yes | | | | |
| | | ZA | | Yes | | | |
| | | XA | Yes | | | | 4 |
| | | YA | | Yes | | | |
| | | ZA | | Yes | | | |
| | ..... | | | | | | .... |
| CA_XA-YA-ZC | ZC | - | Yes | Yes | | | 0 |
| | XA-YA | XA | Yes | | | | 1 |
| | | YA | | Yes | | | |
| | YA-ZC | YA | Yes | | | | 2 |
| | | ZC | | Yes | | | |
| | YA-ZC | YA | Yes | | | | 3 |
| | | ZC | | Yes | Yes | | |
| | XA-YA-ZC | XA | Yes | | | | 4 |
| | | YA | | Yes | | | |
| | | ZC | | | Yes | | |
| | XA-YA-ZC$^{Note\ Z}$ | XA | Yes | | | | 5 |
| | | YA | Yes | | | | |
| | | ZC | | Yes | | | |
| | | XA | Yes | | | | 6 |
| | | YA | | Yes | | | |
| | | ZC | | Yes | | | |
| | | XA | Yes | | | | 7 |
| | | YA | | Yes | | | |
| | | ZC$^{noteW}$ | | Yes | Yes | | |

Note X: TAG number (#W, #X, #Y, #Z) can be set to 0 to 3
Note Y: Contiguous Component carrier can be configured as same TAG
Note Z: Non-Contigous Component carrier can be configure as same TAG
Note W: TAG X is for CC having low frequency

US 9,936,471 B2

MOBILE STATION FOR PERFORMING COMPONENT CARRIER-TO-TIMING ADVANCE GROUP MAPPING

TECHNICAL FIELD

The present invention relates to a mobile station.

BACKGROUND ART

In a mobile communication system supporting LTE (Long Term Evolution)-Advanced, CA (Carrier Aggregation) can be performed by using a Pcell (Primary Cell) which is a serving cell in a PCC (Primary Component Carrier) and an Scell (Secondary Cell) which is a serving cell in an SCC (Secondary Component Carrier).

Meanwhile, such a mobile communication system supporting LTE-Advanced is configured to undergo TA (Timing Advance) control.

Specifically, in the TA control, as shown in FIG. 8, in order to synchronize reception timings (FFT timings) of reception signals from multiple mobile stations UE#1 and UE#2, a radio base station eNB is configured to inform the mobile stations UE#1 and UE#2 of TA values, while the mobile stations UE#1 and UE#2 are configured to adjust transmission timings of uplink signals on the basis of the informed TA values.

For example, as shown in FIG. 8, the radio base station eNB causes the mobile station UE#2 located on a cell edge to transmit an uplink signal at an earlier timing than that from the mobile station UE#1 located at a cell center.

On the other hand, when "Inter-band UL CA" is performed by using CCs (Component Carriers) of different bands, radio characteristics (delay characteristics and attenuation characteristics) vary among the CCs. Here, it is necessary to carryout the TA control of cells in the CCs having the different radio characteristics in such a manner as to conform to the individual radio characteristics.

In addition, when each CC has a different transmission point, or when "UL CA" is performed by using a CC#1 and a CC#2 with the CC#1 being under the control of a macro radio base station and the CC#2 being under the control of a small radio base station (for example, an RRH), for instance, it is necessary to carry out the TA control in conformity to respective propagation delays in that case as well because there is a difference between the distances to a mobile station UE from the radio base stations eNB.

Note that the above-mentioned situation occurs not only in the case of performing "Inter-band UL CA" but also in the case of performing "UL CA" in general.

Specifically, when "UL CA" is performed, the mobile communication system supporting LTE-Advanced is configured to group a Pcell and Scells #1 to #3 into groups (TAGs; Timing Advance Groups) each having equivalent radio characteristics as shown in FIG. 9, and to carry out the TA control for each of the groups.

The above-described TA control is called "Multiple Timing Advances (MTA) control."

Here, there are two types of groups, namely, a pTAG including the Pcell (a TAG#A in the example of FIG. 9) and an sTAG consisting of the Scells (a TAG#B in the example of FIG. 9).

PRIOR ART DOCUMENT

Non-Patent Document

Non-patent document 1: 3GPP Tdoc R2-116503

SUMMARY OF THE INVENTION

However, under the present circumstances, when "UL CA" is performed, a mobile station UE can notify a radio base station eNB of supported bands and CCs, but cannot notify the radio base station eNB of a TAG settable to each CC.

As a consequence, there is a problem that the radio base station eNB cannot configure appropriate CC-to-TAG mapping for each mobile station UE.

For example, if the radio base station eNB attempts to control "UL CA" performed by the mobile station UE without configuring the appropriate CC-to-TAG mapping, there is a problem that an IOT (Inter-Operability Test) between the radio base station eNB and the mobile station UE cannot be guaranteed.

The present invention has been made in view of the above-mentioned problem. An objective of the present invention is to provide a mobile station which enables configuring appropriate CC-to-TAG mapping when the mobile station performs "UL CA."

A first feature of the present invention is summarized as a mobile station used in a mobile communication system configured to enable carrier aggregation by use of multiple component carriers, the mobile station including: a management unit configured to manage one or multiple timing advance groups; an adjustment unit configured to make adjustment to synchronize transmission timings of uplink signals within the component carriers which belong to the same timing advance group; and a transmission unit configured to perform notification that notifies the radio base station of a combination of supported bands, supported CCs and settable timing advance groups, and the bands and the component carriers grouped in the timing advance groups included in the combination.

BRIEF DESCRIPTION OF THE DRAWINGS

FIG. 3 is a view showing an example of a format of an information element "UE-EUTRA-Capability" to be transmitted by the mobile station according to the first embodiment of the present invention.

FIG. 5 is a view showing an example of a format of the information element "UE-EUTRA-Capability" to be transmitted by a mobile station according to a first modified example of the present invention.

FIG. 6 is a view showing the example of the format of the information element "UE-EUTRA-Capability" to be transmitted by the mobile station according to the first modified example of the present invention.

FIG. 7 is a view for explaining an information element "SupportedMultipleTA-CapabilitySet-r11" to be transmitted in the information element "UE-EUTRA-Capability" transmitted by the mobile station according to the first modified example of the present invention.

MODES FOR CARRYING OUT THE INVENTION

Mobile Communication System of First Embodiment of Invention

A mobile communication system according to a first embodiment of the present invention will be described with reference to FIG. 1 to FIG. 4.

The mobile communication system of the embodiment supports LTE-Advanced, and is configured to be capable of performing CA by using a Pcell and an Scell.

Specifically, the mobile communication system of the embodiment is configured to be capable of performing "UL CA" while using CCs of different bands, such as "Inter-band UL CA," for example.

Figure 1:
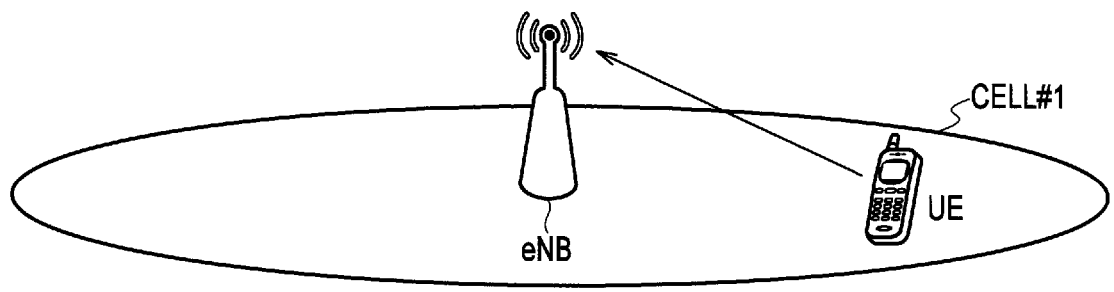
FIG. 1 is an overall configuration diagram of a mobile communication system according to a first embodiment of the present invention.

As shown in FIG. 1, the mobile communication system of the embodiment includes a radio base station eNB and the like which manages a cell #1.

Figure 2:
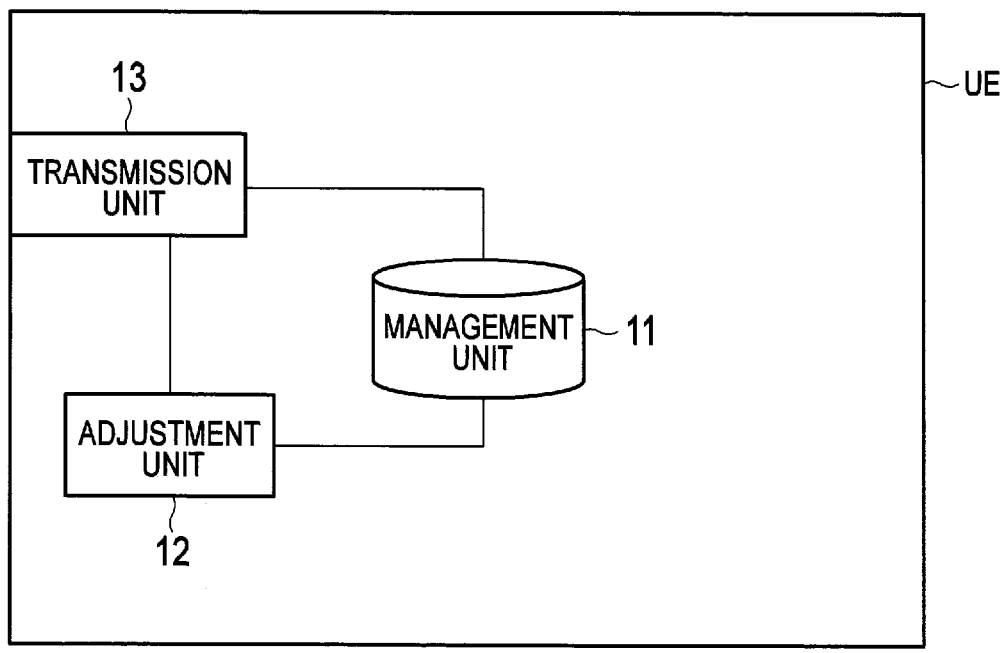
FIG. 2 is a functional block diagram of a mobile station according to the first embodiment of the present invention.

As shown in FIG. 2, a mobile station UE of the embodiment includes a management unit 11, an adjustment unit 12, and a transmission unit 13.

The management unit 11 is configured to manage one or more TAGs each including any of the Pcell and the Scells, i.e., to manage a pTAG and an sTAG.

Specifically, the management unit 11 is configured to manage serving cells (or CCs) which belong to the pTAG and the sTAG.

The adjustment unit 12 is configured to carry out MTA control. Specifically, the adjustment unit 12 is configured to make adjustment to synchronize transmission timings of uplink signals from cells out of the Pcell and the Scells (or a PCC and SCCs), which belong to the same TAG.

The transmission unit 13 is configured to transmit various signals to the radio base station eNB.

Specifically, the transmission unit 13 is configured to notify the radio base station eNB of: a combination of supported bands, supported CCs and settable TAGs; and the bands and the CCs grouped in the TAGs included in the combination.

Figure 4:
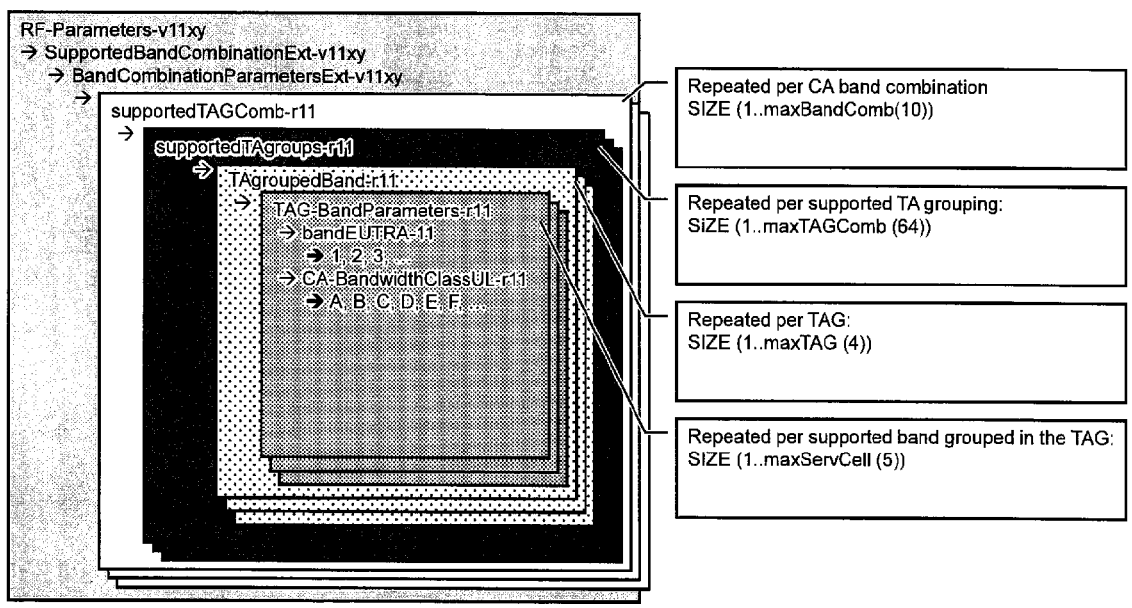
FIG. 4 is a view showing an example of the information element "UE-EUTRA-Capability" to be transmitted by the mobile station according to the first embodiment of the present invention.
Figure 8:
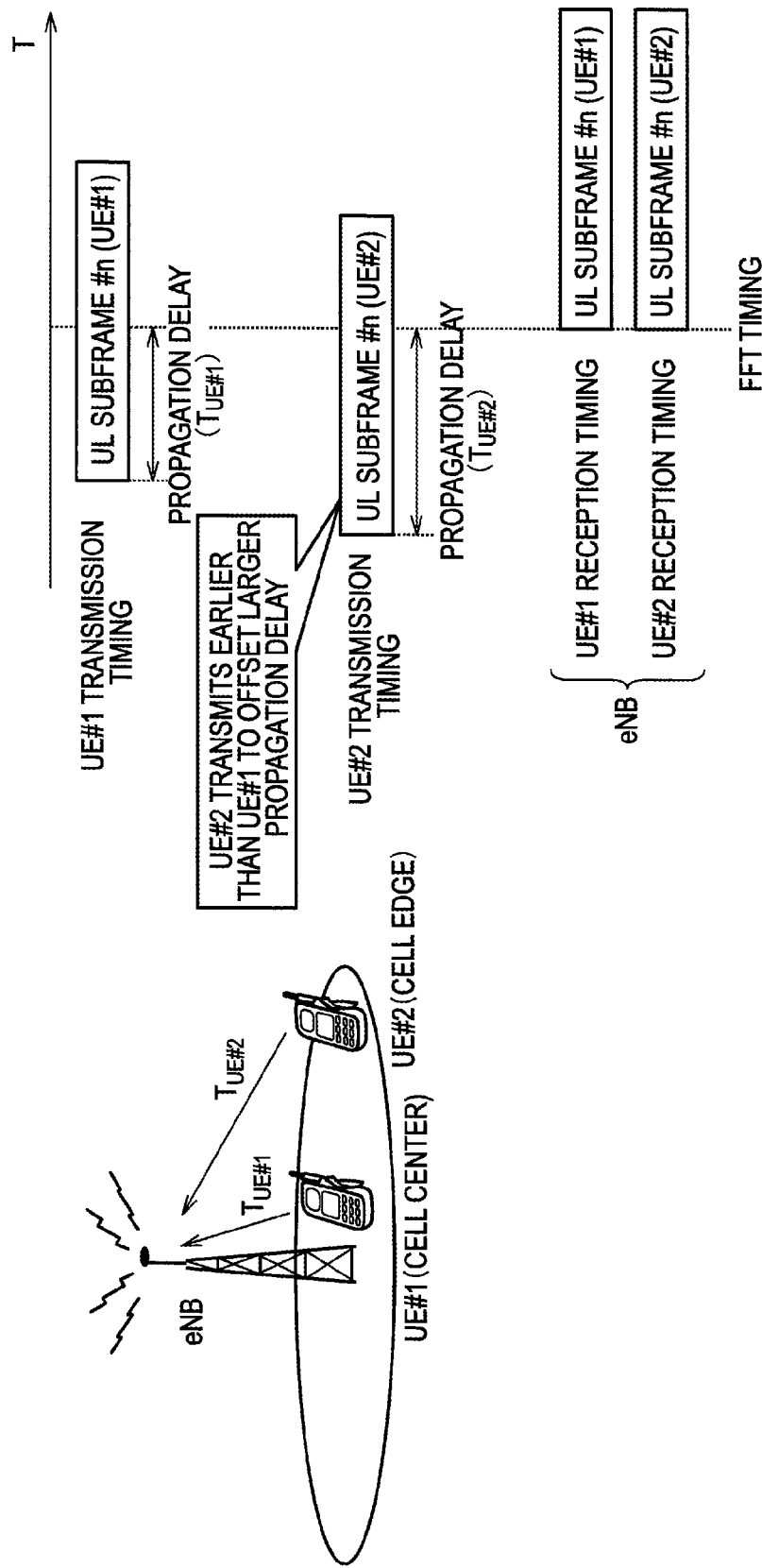
FIG. 8 is a diagram for explaining a conventional mobile communication system.
Figure 9:
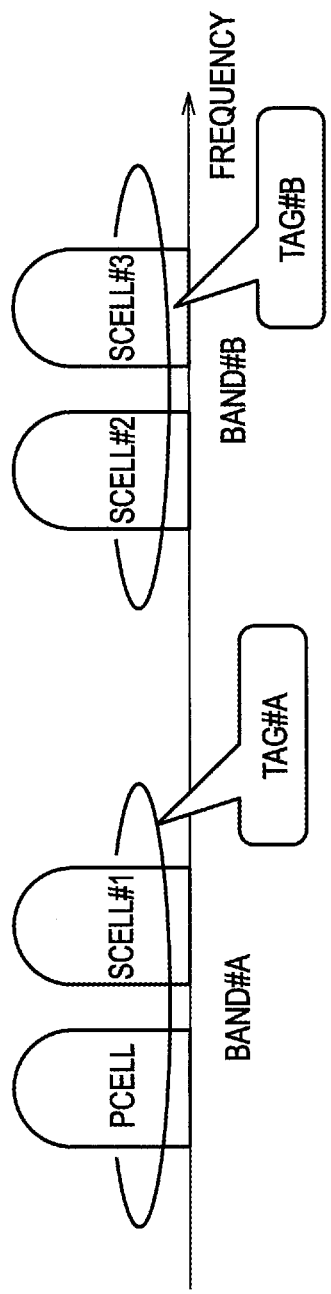
FIG. 9 is a diagram for explaining the conventional mobile communication system.

For example, as shown in FIG. 3 and FIG. 4, the transmission unit 13 is configured to: add a new information element "RF-Parameters-v11xy" to an information element "UE-EUTRA-Capability" defined in 3GPP TS36.331; and notify the radio base station eNB of the bands and CCs supported by the mobile station UE, and the TAG settable for each of the CCs, by use of the information element "RF-Parameters-v11xy."

Specifically, as shown in FIG. 3 and FIG. 4, the transmission unit 13 may be configured to: notify of the above-mentioned TAGs (such as a TAG#W and a TAG#X) by use of an information element "TAgroupedBand-r11" in an information element "supportedTAgroups-r11" in an information element "supportedTAGComb-r11" in an information element "BandCombinationParametersExt-v11xy" in an information element "SupportedBandCombinationExt-v11xy" in the information element "RF-Parameters-v11xy"; notify of the above-mentioned bands (such as 1, 2, 3, and so on) by use of an information element "bandEUTRA" in an information element "TAG-BandParameters-r11" in the information element "TAgroupedBand-r11"; and notify of the above-mentioned CCs (such as A, B, C, and so on) by use of an information element "CA-BandwidthClassUL-r11" in the information element "TAG-BandParameters-r11."

Here, the information element "supportedTAGComb-r11" is an information element which is set for each combination (CA band combination) of the bands set for "Inter-band CA."

Meanwhile, the information element "supportedTAgroups-r11" is an information element which is set for each of bands (supported TA grouping) set for "Inter-band CA."

Moreover, the information element "TAgroupedBand-r11" is an information element set for each TAG.

Furthermore, the information element "TAG-BandParameters-r11" is an information element which is set for each band (supported band grouped in the TAG).

According to the embodiment of the present invention, the radio base station eNB can configure appropriate CC-to-TAG mapping for each mobile station UE on the basis of the combination of the bands, the CCs, and the TAGs notified by the mobile station UE.

In addition, the information element "UE-EUTRA-Capability" may be notified in accordance with a predetermined order such as an ascending order or a descending order of frequencies of the CCs.

Modified Example 1

With reference to FIG. 5 to FIG. 7, a mobile communication system according to a first modified example of the present invention will be described below while focusing on differences from the mobile communication system of the above-mentioned first embodiment.

In the mobile communication system of the first modified example, as shown in FIG. 5, the transmission unit 13 is configured to: add the new information element "RF-Parameters-v11xy" to the information element "UE-EUTRA-Capability" defined in 3GPP TS36.331; and notify the radio base station eNB of the bands and CCs supported by the mobile station UE, and the TAG settable for each of the CCs, by use of the information element "RF-Parameters-v11xy."

Specifically, as shown in FIG. 5, the transmission unit 13 may be configured to notify of combinations of the above-mentioned TAGs (such as the TAG#W and the TAG#X), the above-mentioned bands (such as 1, 2, 3, and so on), and the above-mentioned CCs (such as A, B, C, and so on), by use of an information element "SupportedMultipleTA-CapabilitySet-r11" in the information element "SupportedBandCombinationExt-v11xy" in the information element "RF-Parameters-v11xy."

As shown in FIG. 6, the information element "SupportedMultipleTA-CapabilitySet-r11" includes a field formed from a bit map.

For example, when the mobile station UE corresponds to "Multiple-TAcapabilityset"="N" (see FIG. 7), the transmission unit 13 may set "1" to a bit N in the information element "SupportedMultipleTA-CapabilitySet-r11."

Here, the most significant bit (bit 0) in the bit map in the information element "SupportedMultipleTA-CapabilitySet-r11" is assumed to correspond to "Multiple-TAcapabilityset"="0" and the bit (bit 1) next to the most significant bit in the bit map in the information element "SupportedMultipleTA-CapabilitySet-r11" is assumed to correspond to "Multiple-TAcapabilityset"="1".

FIG. 7 shows an example of a table for specifying the combinations of the bands, the CCs, and the TAGs defined by "Multiple-TAcapabilityset."

Note that both the radio base station eNB and the mobile station UE manage the same table.

Here, in "1A," "1" is band identification information while "A" is CC identification information.

In "5A," "5" is band identification information while "A" is the CC identification information.

In "19A," "19" is band identification information while "A" is the CC identification information.

In "XA," "X" is band identification information while "A" is the CC identification information.

In "YA," "Y" is band identification information while "A" is the CC identification information.

In "ZA," "Z" is band identification information while "A" is the CC identification information.

In "ZC," "Z" is the band identification information while "C" is CC identification information. Here, "C" is CC identification information which indicates two discontinuous CCs.

Here, the table may be configured to set "ZA1" and "ZA2" in place of "ZC."

Moreover, in "Combination of Bands configured for UL CA"="XA-YA-ZC" in "CA Configuration"="CA XA-YA-ZC," "Combination Band configured for UL CA"="ZC" may be interpreted such that a CC having a low frequency belongs to the TAG#X (or a TAG#Y).

As shown in FIG. 7, "Multiple-TAcapabilityset" may be designed to start from "0" in each of the combinations of the bands ("Combination of Bands configured for UL CA"/CA band combination) set for "Inter-band CA."

For example, if "Multiple-TAcapabilityset"="0" is set to both of "Combination of Bands configured for UL CA"="XA-YA" and "Combination of Bands configured for UL CA"="YA-ZA" in "CA Configuration"="CA XA-YA-ZA" in the table, the transmission unit 13 may be configured to notify of the fact that it is possible to support both of the above-mentioned "XA-YA" and "YA-ZA" by means of setting "true" to the above-mentioned information element "SupportedMultipleTA-CapabilitySet-r11."

According to the mobile communication system of the first modified example, the radio base station eNB can configure appropriate CC-to-TAG mapping for each mobile station UE on the basis of the combination of the bands, the CCs, and the TAGs notified by the mobile station UEs.

In addition, according to the mobile communication system of the first modified example, the mobile station UE can notify the radio base station eNB of the combination of supported bands, CCs, and TAGS with a small amount of data by using the above-mentioned information element "SupportedMultipleTA-CapabilitySet-r11."

The above-described features of the embodiment may also be expressed as follows.

A first feature of the embodiment is summarized as the mobile station UE used in the mobile communication system configured to enable "UL CA (carrier aggregation by use of multiple component carriers)," the mobile station including: the management unit 11 configured to manage one or multiple TAGs (timing advance groups); the adjustment unit 12 configured to make adjustment to synchronize transmission timings of uplink signals within the CCs (component carriers) which belong to the same TAG; and the transmission unit 13 configured to perform notification that notifies the radio base station eNB of the combination of supported bands, supported CCs and settable TAGs, and the bands and the CCs grouped in the TAGs included in the combination.

In the first aspect of the embodiment, the transmission unit 13 may be configured to transmit "Multiple-TAcapabilityset (timing advance capability combination information)" which indicates the combination of the band, the CC, and the TAG mentioned above.

In the first aspect of the embodiment, the transmission unit 13 may be configured to perform the above-described notification in accordance with a predetermined order.

It should be noted that the foregoing operations of the mobile station UE and the radio base station eNB may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE and the radio base station eNB. Otherwise, the storage medium and the processor may be provided as discrete components inside the mobile station UE and the radio base station eNB.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-243123 (filed on Nov. 2, 2012) is incorporated by reference in the present specification.

INDUSTRIAL APPLICABILITY

As described above, according to the present invention, it is possible to provide a mobile station which enables configuring appropriate CC-to-TAG mapping when the mobile station performs "UL CA."

EXPLANATION OF THE REFERENCE NUMERALS

UE mobile station
eNB radio base station
11 management unit
12 adjustment unit
13 transmission unit

The invention claimed is:

1. A mobile station used in a mobile communication system configured to enable carrier aggregation by use of a plurality of component carriers, the mobile station comprising:
 a management unit configured to manage one or a plurality of timing advance groups;
 an adjustment unit configured to make adjustment to synchronize transmission timings of uplink signals within the component carriers which belong to the same timing advance group; and a transmission unit configured to perform notification that notifies the radio base station of UE-EUTRA-Capability including a combination of supported bands and supported component carriers, and settable timing advance groups for the combination.

2. The mobile station according to claim 1, wherein the transmission unit is configured to perform the notification in a predetermined order.

3. A mobile station used in a mobile communication system configured to enable carrier aggregation by use of a plurality of component carriers, the mobile station comprising:

circuitry configured to
manage one or a plurality of timing advance groups;
make adjustment to synchronize transmission timings of uplink signals within the component carriers which belong to the same timing advance group; and
perform notification to notify the radio base station of UE-EUTRA-Capability including a combination of supported bands and supported component carriers, and settable timing advance groups for the combination.

4. The mobile station according to claim 3, wherein the circuitry is configured to perform the notification in a predetermined order.

5. A method performed by a mobile station used in a mobile communication system configured to enable carrier aggregation by use of a plurality of component carriers, the method comprising:

managing one or a plurality of timing advance groups;
making adjustment to synchronize transmission timings of uplink signals within the component carriers which belong to the same timing advance group; and
performing notification that notifies the radio base station of UE-EUTRA-Capability including a combination of supported bands and supported component carriers, and settable timing advance groups for the combination.

6. The method according to claim 5, wherein the notification is performed in a predetermined order.

\* \* \* \* \*